United States Patent Office 2,816,160
Patented Dec. 10, 1957

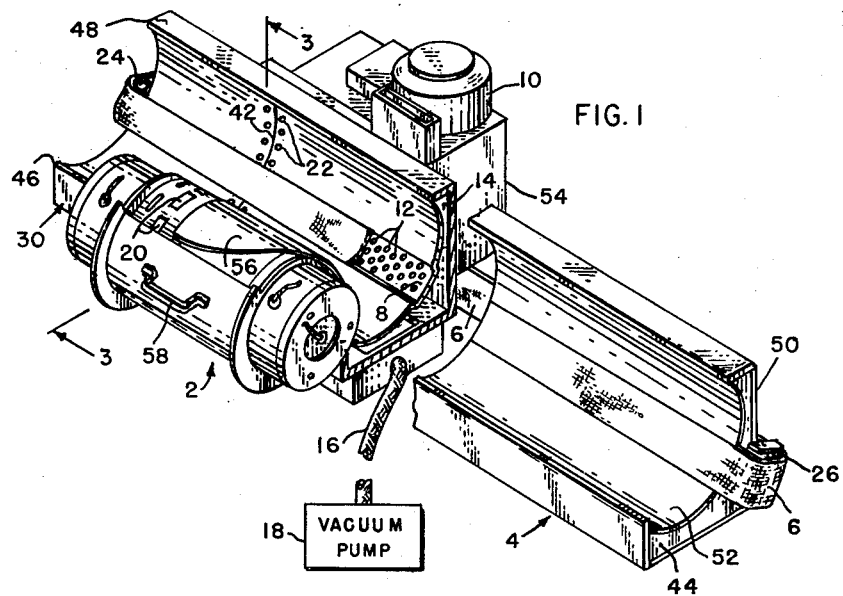
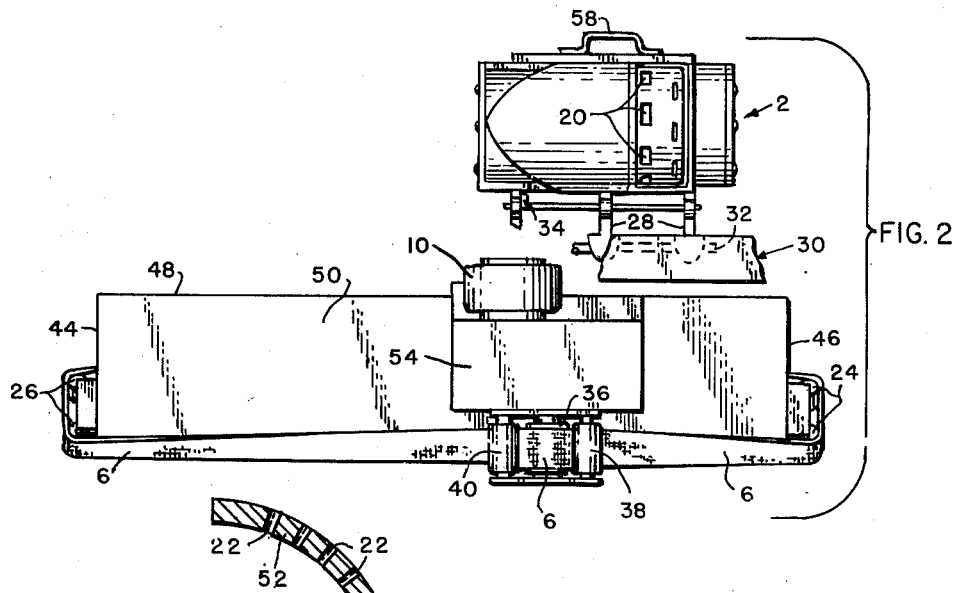
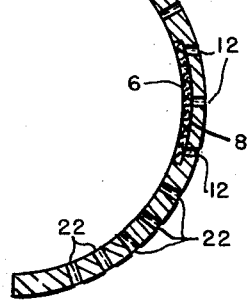

2,816,160

CONTINUOUS FEED FACSIMILE SCANNERS WITH ENDLESS BELT SUCTION TYPE DRIVE

Charles J. Young, Princeton, N. J., assignor to the United States of America as represented by the Secretary of the Army Application July 2, 1954, Serial No. 441,192

7 Claims. (Cl. 178—7.1)

This invention relates to facsimile scanners and has for its primary object to provide an improved, rapid and continuous feed mechanism particularly suited for high speed facsimile scanners.

One type of facsimile scanner is capable of scanning several lines of copy material simultaneously thereby providing increased operating speed. This increased scanning speed has created the problem of providing feed mechanism which will reliably and continuously feed copy material at the increased speeds permitted by such scanners.

In accordance with this invention, the copy material is fed by means of an endless movable belt of porous material upon which the copy is placed. Means is provided to create a suction through the pores of the fabric while it is in motion to hold the copy material. The belt runs in a channel of a support surface, which is preferably semicylindrical, and holes extending from the bottom of the channel to an evacuated chamber provide the suction for holding the copy material against the belt and the support surface.

Additional objects and features of the invention will become apparent from the following detailed description of the attached drawing, in which:

Fig. 1 is a perspective view of a facsimile scanner with a portion broken away in order to better illustrate the scanner;

Fig. 2 is a rear elevational view of the facsimile scanner of Fig. 1, with the scanning head removed from the material conveyor portion at the swivel bar; and Fig. 3 is a partial, sectional, fragmentary view taken on line 3—3 of Fig. 1.

Referring to the drawing, Fig. 1 illustrates a high speed facsimile system, in which 2 is a scanning head, 4 is a semicylindrical trough having an arcuate length of 180°, 6 is an endless porous fabric conveyor belt which substantially fills and is moved within a channel or gib 8 of trough 4 by a motor 10. The thickness of the belt is substantially equal to the depth of the channel so that copy material fed along the trough would lie in a true cylinder. A plurality of openings 12 are along the bottom of the gib portion 8. A hollow chamber 14 is provided below trough 4 and openings 12 open thereinto. Also opening into the hollow chamber 14 is a connecting hose 16 connecting a vacuum pump 18 for providing a partial vaccum in chamber 14.

The scanning head 2 has an even number of optical scanners 20, in this case eight scanners, equally spaced around the periphery of the scanning head. Each scanner is connected to the one diametrically opposite it, so that the first and fifth, second and sixth, etc. optical scanners are connected together and comprise four separate optical scanning pairs which are respectively connected to four separate transmission channels. It will be understood that a greater or lesser number pairs may be used. Aligned on opposite sides of the line scanned by the optical scanners 20 are a pair of lines of openings 22 opening into the hollow chamber 14.

Also shown in Fig. 1 are rollers 24 and 26 which are connected to the base portions of trough 4 in order to provide a substantially frictionless movement of the belt within the channel 8.

In Fig. 2 the back view of the facsimile scanner is shown in which the scanning head 2 is broken away and separated from the trough portion in order to illustrate the optical scanners 20, and the manner in which the scanning head 2 is movable with respect to the trough 4. The scanning head is connected by means of rods 28 to the side 30 of trough 4 by means of a swivel bar 32. Stop 34 regulates the movement of the scanning head 2 with respect to the trough 4. Also illustrated in Fig. 2 is the motor 10 and rollers 36, 38 and 40 and rollers 24 and 26. Roller 36 is geared to the motor 10 and frictionally engages the belt 6, rollers 38 and 40 being used to hold the belt 6 in contact with and partially around roller 36.

Fig. 3 illustrates in section the curved portion of trough 4 with openings 22 which are on the left side of line 42, the line on trough 4 that is scanned by optical scanners 20. Also shown in Fig. 3 is the endless conveyor belt 6, gib 8 and the holes 12 under the conveyor belt. 6.

Trough 4 is made up of plates 30, 44, 46, 48, 50 and curved plate 52, and is air-tight except for openings 12 and 22. The endless conveyor belt 6 is made of a porous fabric, porous enough to allow the suction produced by the vacuum pump to hold material to be scanned on the belt while the belt moves at a speed of 2, 4 or 8 pages per minute. The holes 22 are sufficiently large for holding the material, which is to be scanned, in contact with the inner semicircumference of curved plate 52.

The partial vacuum maintained in the chamber behind plate 52 of semicylindrical trough 4 is approximately 10 to 20 mm. of mercury. The vacuum pressure and the moving conveyor belt coact to move the paper or material to be scanned along curved plate 52 of trough 4. The additional lines of air holes 22 extend transversely along the entire periphery of the trough and hold the paper or material to be scanned to the 180° contact with the trough at the scanning line and perfect focus is thereby achieved. Motor 10 can be a 3-speed motor, or three different gears may be used to provide for three different speeds to move the belt 6 within the gib 8. Gear box 54 is provided with the necessary gears to provide for the three different speeds of paper feed, such as 2, 4, or 8 pages per minute. The belt 6 is wrapped around pulley 36 and is held sufficiently tightly thereto by substantial frictionless pulleys 38 and 40. The endless conveyor belt system can be made to operate in either direction. An automatic reversing switch may be added so that the machine may be made to operate normally or to transmit a 15" copy alternately forward and back. Material of any width from the size of a postage stamp to that of a piece of paper 8½" wide can be carried by the conveyor belt 6 on plate 52 through and under the scanning head 2.

The material feed problem is simplified when the 180° instead of 360° scanning cylinder is used. However, the optical system is then made more complicated because 2 optical paths must then be provided for each channel at 180° from each other. As one optical scanner leaves the trailing edges of the half cylinder the oppositely disposed scanner enters the leading edge and continuous scanning is provided. When the motor 10 is geared to drive eight pages per minute all eight of the optical scanners 20 are used. When motor 10 is geared for four pages per minute only four of the optical scanners 20 are used. When only two pages per minute are scanned only two oppositely disposed scanners are used.

Within the scanning head 2 is a synchronized motor drive, amplifier, etc. which is hinged on plate 30 by swivel bar 32 and drops into place centered in the paper feed trough 4 in the portion provided proximate to plate 52. When the scanning head 2 is at rest against adjustable stop 34, all microscopes in the optical scanners are in correct focus for the average thickness of paper copy material; and approximately one-eighth of an inch clearance is allowed between the scanning head and the trough. As an additional safety measure, the entire head 2 can be rapidly moved out of engagement with plate 52 by means of the swivel bar 32 which is hinged to plate 30 in case of paper feed jamming.

The tapered shell 56, on scanning head 2, is used to prevent the sheets from crumpling or catching on the scanner head. This tapered shell forms a guide which meets the paper first at the center where it is securely held down by the vacuum pressure and then the tapered shell 56 widens to approximately the full 180° arc just prior to the paper's arrival at the scanning line 42. The holes 22 to the right of the scanning line 42 at this time take over from the guide 56 and in conjunction with the suction, hold the paper securely down along the entire arcuate length of plate 52.

By this invention, two important results are obtained. Firstly, facsimile scanning can now be accomplished as rapidly as the scanning head and circuits therein will permit, since a very rapid material feeding mechanism has been provided. Secondly, it facilitates proper positioning of the paper proximate to the scanning line in a rapid scanning device.

The operator of a facsimile scanner now only need place the sheets onto the driving belt 6 at the rate of approximately eight pages per minute, and the carrier belt 6 and the scanning head 2 will take care of all the other operations. The operator need only keep an eye on the paper to see that it does not jam into the scanning head 2. If the paper does jam into the scanning head 2, handle 58 is provided by means of which the scanning head may be rapidly moved away from plate 52 of trough 4.

While a preferred embodiment of the invention has been described to facilitate an understanding of the features of the invention, many variations will be apparent to those skilled in the art, and it is aimed in the appended claims to cover all modifications which fall within the true spirit and scope of the invention.

What is claimed is:

1. A sheet feeding mechanism comprising a support surface along which sheet material is adapted to be fed; a channel in said support surface, said channel having apertures along the bottom thereof, an endless belt of porous fabric material substantially completely filling said channel and movable therein, the upper surface of said belt being substantially flush with said support surface and means for creating a suction through said apertures and through the pores of said belt in a direction to hold sheet material placed upon said support surface against belt for motion therewith along said support surface.

2. In a facsimile scanning system, a support surface along which sheet material to be scanned is adapted to be fed, a channel in said support surface, the bottom of said channel having apertures therein, an endless belt of porous fabric material completely filling said channel and disposed for movement therein in contact with a portion of the surface of said sheet material, means for generating a suction through said apertures and through the pores of said belt in a direction to hold sheet material placed upon said support against the surface thereof, a scanning means movable along a scanning line transverse to said channel for scanning successive lines of said sheet material, said support having additional linearly arranged perforations in the region of said scanning line on either side of said channel, and means to provide a suction through said additional perforations thereby to more firmly hold said sheet material against said support surface in the region of said scanning line.

3. In a facsimile scanning system, a support surface along which sheet material adapted to be scanned is adapted to be fed, a channel in said support surface, the bottom of said channel having apertures therein, a movable endless belt of porous fabric material completely filling said channel so that its surface is substantially flush with said support surface, means for generating a suction through said apertures and through the pores of said belt in a direction to hold sheet material placed upon said belt against said support surface, a scanning means movable along a scanning line transverse to said channel for scanning successive lines of said sheet material, said support having additional perforations on opposite sides of said line, and means to provide a suction through said additional perforations thereby to firmly hold said sheet material against said support surface in the region of said scanning line.

4. A feeding mechanism for paper sheets or the like having a predetermined maximum width, a cylindrical concave support surface along which said sheets are adapted to be fed, an axially extending channel in said support surface having a width which is less than said maximum width, a movable endless belt completely filling said channel, the upper surface of said belt being substantially flush with said support surface, said belt and the bottom of said channel being perforate, and means for creating suction through said bottom and said belt thereby to draw and hold sheet material placed on said belt against said concave support surface.

5. A feeding mechanism as set forth in claim 4, wherein said concave surface is circular.

6. A feeding mechanism as set forth in claim 5, wherein the circumference of said surface is 180°.

7. A feeding mechanism as set forth in claim 6, wherein said support surface includes a pair of parallel lines of perforations along substantially the entire circumference thereof to more firmly hold sheet material against said surface along a line transverse to said channel.

References Cited in the file of this patent

UNITED STATES PATENTS

| | | |
|---|---|---|
| 1,077,399 | Droitrour | Nov. 4, 1913 |
| 1,625,642 | Droitrour | Apr. 19, 1927 |
| 2,314,027 | Young | Mar. 16, 1943 |
| 2,443,953 | Gillespie | June 22, 1948 |
| 2,462,439 | Thompson | Feb. 22, 1949 |
| 2,567,307 | Wise | Sept. 11, 1951 |

FOREIGN PATENTS

| | | |
|---|---|---|
| 723,575 | Germany | Aug. 6, 1942 |